(12) United States Patent
Meriac et al.

(10) Patent No.: US 10,922,155 B2
(45) Date of Patent: Feb. 16, 2021

(54) METHODS OF COMMUNICATION BETWEEN A REMOTE RESOURCE AND A DATA PROCESSING DEVICE

(71) Applicant: ARM IP Limited, Cambridge (GB)

(72) Inventors: Milosch Meriac, Cambridge (GB); Geraint David Luff, Cambridge (GB); Christopher Mark Paola, Cambridge (GB)

(73) Assignee: ARM IP LIMITED, Cambridge (GB)

( * ) Notice: Subject to any disclaimer, the term of this patent is extended or adjusted under 35 U.S.C. 154(b) by 387 days.

(21) Appl. No.: 15/525,620

(22) PCT Filed: Oct. 28, 2015

(86) PCT No.: PCT/GB2015/053236
§ 371 (c)(1),
(2) Date: May 10, 2017

(87) PCT Pub. No.: WO2016/075434
PCT Pub. Date: May 19, 2016

(65) Prior Publication Data
US 2017/0329658 A1    Nov. 16, 2017

(30) Foreign Application Priority Data
Nov. 12, 2014   (GB) ..................... 1420100

(51) Int. Cl.
*G06F 9/54*     (2006.01)
*G06F 9/50*     (2006.01)

(52) U.S. Cl.
CPC ............ *G06F 9/546* (2013.01); *G06F 9/5027* (2013.01); *G06F 2209/548* (2013.01)

(58) Field of Classification Search
None
See application file for complete search history.

(56) References Cited

U.S. PATENT DOCUMENTS 5,357,612 A * 10/1994 Alaiwan ................ G06F 9/546
709/216
6,477,584 B1   11/2002 Hickerson
(Continued)

FOREIGN PATENT DOCUMENTS

| WO | WO 03/071435  | 8/2003 |
| WO | WO 2013/005121 | 1/2013 |
| WO | WO 2013/049399 | 4/2013 |

OTHER PUBLICATIONS

International Search Report and Written Opinion of the ISA for PCT/GB2015/053236, dated Jan. 28, 2016, 14 pages.
(Continued)

*Primary Examiner* — Umut Onat
(74) *Attorney, Agent, or Firm* — Nixon & Vanderhye, P.C.

(57) ABSTRACT

Methods of communication between a remote resource and a data processing device, the system include storing in a transaction queue a message posted from the remote resource; sending a request to create a guest transaction queue, the guest transaction queue being accessible by both the data processing device and the remote resource; creating the guest transaction queue; reading, by the data processing device, the message from the remote resource; responding, from the data processing device to the remote resource by posting a message to the guest transaction queue; reading, by the remote resource, the message from the data processing device.

15 Claims, 6 Drawing Sheets

(56) References Cited

U.S. PATENT DOCUMENTS

| | | | | |
|---|---|---|---|---|
| 7,886,295 | B2* | 2/2011 | Burger | G06F 9/546 |
| | | | | 718/100 |
| 8,549,579 | B2* | 10/2013 | Dixon | H04L 63/101 |
| | | | | 726/1 |
| 8,631,461 | B2* | 1/2014 | Dixon | H04L 63/101 |
| | | | | 726/1 |
| 9,436,532 | B1* | 9/2016 | Chandrasekaran | G06F 9/546 |
| 2005/0010816 | A1* | 1/2005 | Yu | H04L 63/0272 |
| | | | | 726/4 |
| 2007/0226542 | A1* | 9/2007 | Beeston | G06F 11/261 |
| | | | | 714/33 |
| 2008/0140690 | A1* | 6/2008 | Cuomo | G06F 9/5033 |
| 2010/0268781 | A1 | 10/2010 | Schofield | |
| 2013/0013924 | A1 | 1/2013 | Dixon | |

OTHER PUBLICATIONS

Search Report for GB 1420100.8, dated May 21, 2015, 3 pages.
Examination Report dated Nov. 30, 2020, issued in Application No. GB1420100.8, 5 pages.

* cited by examiner

```
Site secret
{
    "scope": "/data",                    ← Secret applies to all subpaths of /data
    "url": {
        "secret": {"data": "a secret string", "encoding": "plain"},
        "hmac": "SHA256",
        "template": "/data/{hex:22}"
    },
    "content": {
        "key": {
            "data": "another secret string",
            "encoding": "plain"
        },
        "encryption": "AES192"
    },
    "keyExpansionUrl": "https://..."     ← Where to go for more site secrets
}
```

How to encode URL

How to encode document content

FIG. 6a

Alice's health monitor — Obscured URL — PIPS-enabled cloud

```
POST /data/effc072f96a86b87b8b12352a
Host: http://...
Content-Length: 61
Content-Type: application/x-pips U2FsdGVkX19DX2Jy6RTuinsdhpuFDTkXkQjqZGnP3kJjWtTUa85sYOFxZYoF0W0T
8TxGVIg5hVhH9nQrT8gi7YsRaPb81emXevwBB0iprWw=
```
← Encrypted data

FIG. 6b

METHODS OF COMMUNICATION BETWEEN A REMOTE RESOURCE AND A DATA PROCESSING DEVICE

This application is the U.S. national phase of International Application No. PCT/GB2015/053236 filed 28 Oct. 2015, which designated the U.S. and claims priority to GB Patent Application No. 1420100.8 filed 12 Nov. 2014, the entire contents of each of which are hereby incorporated by reference.

The present technique relates to the field of data processing. More particularly, the technique relates to communications between a data processing device and a remote resource.

Cloud computing services are becoming more common. More and more devices are being connected to the cloud, for example as part of the "Internet of Things". For example, relatively small devices such as temperature sensors, healthcare monitors and electronic door locks can be connected to the cloud so that they can be accessed and controlled using remote systems. For example, the door may be remotely opened from a remote platform, or data from a temperature sensor or healthcare monitor may be aggregated at a remote location and accessed from another device. The devices and remote systems may communicate through a message transaction system held on a cloud server. Typically, the messages of a transaction are received at one or more queues of the cloud server. By providing one or more queues on the cloud server the devices and remote systems can communicate asynchronously so that it is not necessary for both to be active simultaneously in order for them to communicate.

In some instances communications between devices, remote systems and resources is security based using encrypted messages and perhaps only allowing permission based access to queues. Such permission based access to queues may require each device to be registered and authenticated with a particular cloud computing service before messages can be exchanged between devices. Accordingly, where remote devices want to communicate with each other via different cloud computing services then such communication may not be possible or may require additional computing resource in pre-authentication and registration steps.

The present technique provides for an improved communication between devices and remote resources. The remote resource may correspond to any data or device accessed remotely by a device. For example, the remote resource may comprise a data processing device or embedded system which can be controlled remotely from another platform; a remote computer, content aggregator, server or cloud platform which receives data posted by the data processing device; or a website or server accessed from the data processing device. The access to the remote resource may include writing data to the remote resource, reading data from the remote resource, and/or instructing a device associated with the remote resource to carry out an action, for example.

Present techniques will now be described, by way of example only, and with reference to the accompanying drawings of which.

The description provided below and the accompanying figures are intended to illustrate the functions of the present embodiments, and the sequence of steps for constructing and operating the present embodiments. It is not intended to represent the only forms in which the present example may be constructed or utilized. However, the same or equivalent functions and sequences may be accomplished by different example.

Viewed from one aspect, the present technique provides for a method of communication between a remote resource and a data processing device, the method including: storing in a transaction queue a message posted from the remote resource; sending a request to create a guest transaction queue, the guest transaction queue being accessible by both the data processing device and the remote resource; creating the guest transaction queue; reading, by the data processing device, the message from the remote resource; responding, from the data processing device to the remote resource by posting a message to the guest transaction queue; and reading, by the remote resource, the message from the data processing device.

The remote resource may send the request to create the guest transaction queue at the time of posting the message. An option is for either the remote resource or the data processing device to grant the other authority to manage queues on their associated servers. This would enable the so authorised device or resource to create and delete queues and also perform operations like query and remove messages from the queue. Further, any guest queue may be creatable by any device or resource seeking a reply from the other however, an internet service provider may require data sent to the guest queue to be "pay to send" not "pay to receive". In this example, if two guests created queues on a cloud server they would not be able to communicate unless the device or resource that posted to the guest queue had an account with the internet service provider and was therefore responsible for the bandwidth of its own messages.

The remote resource may send the request to create the guest transaction queue and the request may be sent direct to the server application or to the data processing device. If the request is sent to the data processing then the data processing device would send the request to create the guest transaction queue else the server would create the guest queue upon request. It may be convenient that the message from the remote resource comprises information that the data processing device should use the guest transaction queue for responding and a security feature is that only the data processing device can post messages to the guest transaction queue.

It may be the case that messages can be read from the guest transaction queue by more than one remote resource which obviates the need for multiple guest transaction queues to be set up for multiple devices or resources. By creating a guest transaction queue, devices and resources registered and not registered with the server application can communicate. By using queues, the remote resource and the data processing device can communicate asynchronously. In many cases the messages in the queues sent between the remote resource and data processing device are encrypted.

The present technique provides that an anonymous client without any relation to the IoT system registered or not registered with the server application may create random queues on the network to enable interaction with services, devices be they data processing devices and/or remote resources. Such interaction may be asynchronous interaction as described herein.

Viewed from another aspect, the present technique provides a computer hardware comprising server having a memory store configured to store messages received in a transaction queue; processing circuitry configured to create a guest transaction queue upon receipt of a request to create the guest transaction queue; and communication circuitry configured to communicate with a remote resource and a data processing device through the transaction queue and the guest transaction queue; wherein a message from the remote resource to the data processing device can be stored in the transaction queue and a reply to the message from the data processing device to the remote resource is can be stored in the guest transaction device.

Viewed from another aspect, the present technique provides a method of communication between a remote resource and a data processing device, the method including: posting a message to a transaction queue at a server application accessible by the data processing device; sending a request to create a guest transaction queue at the server application, the guest transaction queue being accessible by both the data processing device and the remote resource; reading, by the data processing device, the message from the remote resource; responding, from the data processing device to the remote resource by posting a message to the guest transaction queue; reading, by the remote resource, the message from the data processing device.

Figure 1:
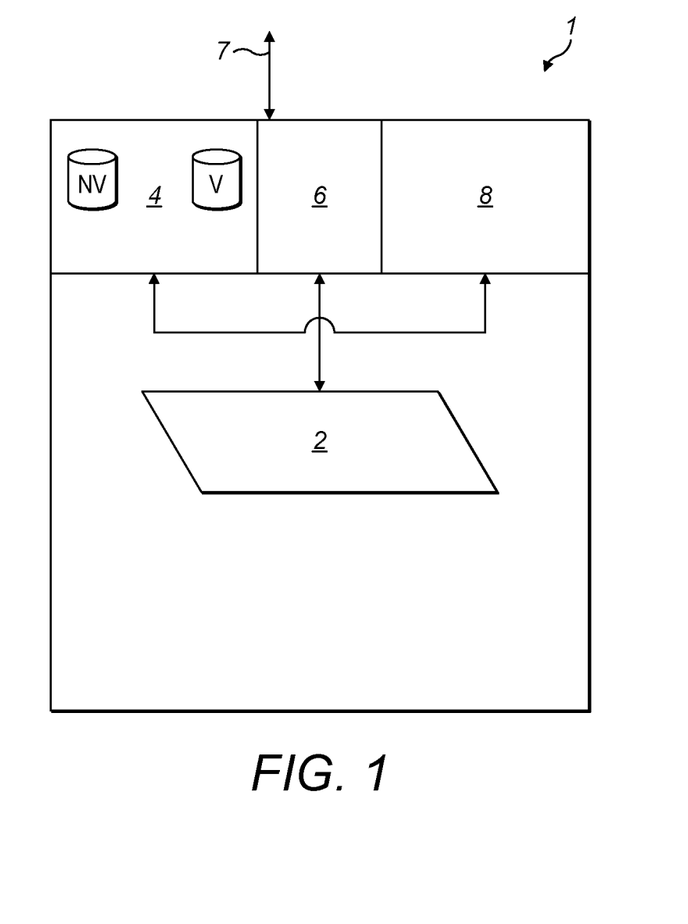
FIG. 1 schematically shows an example of a data processing device.

FIG. 1, schematically shows an example of a data processing device such as an Internet of Things (IoT) device 1.

The circuitry illustrated in FIG. 1 includes processing circuitry 2 coupled to memory circuitry 4 e.g. volatile memory (V)/non-volatile memory (NV), such as such as flash and ROM. The memory circuitry 4 may store programs executed by the processing circuitry 2, as well as data such as UI resources, time-series data, credentials (e.g. cryptographic keys) and/or identifiers for a remote resource(s) (e.g. URL, IP address).

The IoT device 1 may also comprise communication circuitry 6 including, for example, near field communicating (NFC), BLUETOOTH Low Energy (BLE), WiFi, ZIGBEE or cellular circuitry (e.g. 3G/4G) for communicating with the remote resource(s)/device(s) e.g. over a wired or wireless communication link 7. For example, the IoT device 1 may connect to remote resource(s)/device(s) within a local mesh network over BLE, which in turn may be connected to the internet via an ISP router.

The IoT device 1 may also comprise input/output (I/O) circuitry 8 such as sensing circuitry to sense inputs (e.g. via sensors (not shown)) from the surrounding environment and/or to provide an output to a user e.g. using a buzzer or light emitting diode(s) (not shown). The IoT device 1 may generate operational data based on the sensed inputs, whereby the operational data may be stored in memory 4. The I/O circuitry 8 may also comprise a user interface e.g. buttons (not shown) to allow the user to interact with the IoT device 1.

The processing circuitry 2 may control various processing operations performed by the IoT device 1 e.g. encryption of data and/or transformation of URLS, communication, processing of applications stored in the memory circuitry 4.

The IoT device 1 may also comprise a display e.g. an organic light emitting diode (OLED) display (not shown) for communicating messages to the user.

The IoT device 1 may generate operational data based on the sensed inputs. Although, the IoT device 1 may comprise large scale processing devices such as a tablet computer or mobile telephone, often the IoT device 1 comprises a relatively small scale data processing device having limited processing capabilities, which may be configured to perform only a limited set of tasks, such as generating operational data and pushing the operational data to a remote resource.

For example, the IoT device 1, may, for example, be an embedded device such as a healthcare monitor, which generates operational data related to a user's health such as heart rate, blood sugar level and/or temperature.

Alternatively, the IoT device 1 may, for example, be an embedded temperature sensor, which generates operational data based on the temperature of the surrounding environment, and may, for example be generated as a time series.

Alternatively, the IoT device 1 may, for example, be a smart-watch comprising a fitness band which generates data relating to movement of a user, for example capturing distance walked/run/swam by a user, or elevation ascended/descended by a user.

In further embodiments, the IoT device 1 may, for example, be a smart-pen, configured to generate operational data relating to the movement of the pen by the user, for example alphanumeric characters or pictures. The IoT device 1 may also be configured to create files such as JPEG/Vector (e.g. SVG)/Portable Document Format (PDF) recording the specific movements.

It will be appreciated that the IoT device 1 may comprise other hardware/software components not described herein depending on the specific function of the IoT device 1. For example, in the case of a smart-pen, the IoT device 1 may comprise an infra-red camera to capture and record movement, and/or a microphone to record audio and to generate sound files for example as Advanced Audio Coding (AAC), MP3 or MP4 files.

Figure 2:
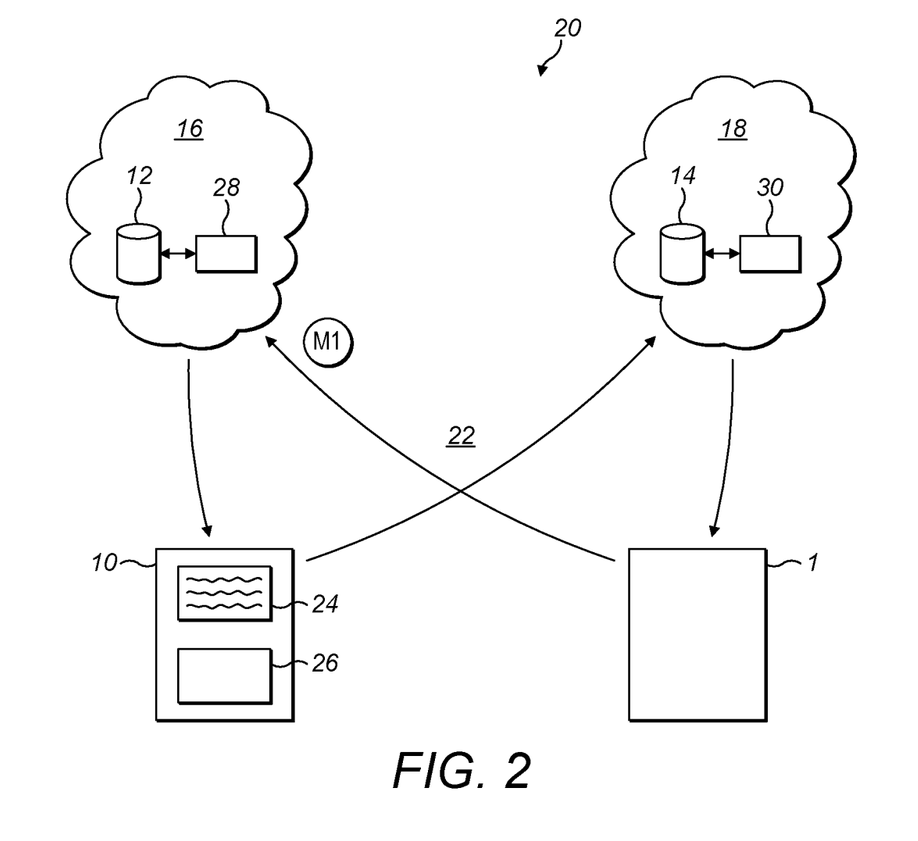
FIG. 2 schematically shows an example of a data processing device in communication with a remote resource using transaction queues on cloud computing systems.

FIG. 2 schematically shows an example of an IoT device 1 in communication with a remote resource 10 using transaction queues 12, 14 on cloud computing server systems 16, 18 respectively within a distributed client-server system 20. The system 20 comprising the computer server systems 16, 18, the IoT device 1 and remote resource 10 are connected by a communication network 22. The communication network 22 may be the Internet, one or more local area networks (LANs), one or more wide area networks (WANs), cellular circuitry (e.g. 3G/4G) for communicating with the remote resource(s)/device(s) e.g. over a wired or wireless communication link 7. For example, the IoT device 1 may connect to remote resource(s)/device(s) 10 within a local mesh network over BLE, which in turn may be connected to the internet via an ISP router.

The remote resource 10 may be a browser 24, which can be an Internet browser having a user interface for display of web application. The user interface can be rendered by the browser 24 using hypertext markup language (HTML) for example. Alternatively, remote resource application 26 may generate tasks for execution.

The remote resource 10 may correspond to any data or device accessed remotely by the IoT device 1. For example, the remote resource 10 may comprise a data processing device or embedded system which can be controlled remotely from another platform; a remote computer, content aggregator, server or cloud platform which receives data posted by the data processing device; or a website or server accessed from the data processing device. The access to the remote resource 10 may include writing data to the remote resource, reading data from the remote resource, and/or instructing a device associated with the remote resource to carry out an action, for example.

In operation, the IoT device 1 posts a message M1 to cloud computing server system 16 and the message M1 is stored in the transaction queue 12 associated with a server application 28. In the present example, cloud computing server system 16 is associated with remote resource 10. The transaction queue 12 is configured such that anyone can post to the transaction queue 12, but only the remote resource 10 that is associated with the cloud computing server system 16 can pull messages from the transaction queue 12. The remote resource 10 pulls message M1 from the transaction queue 12 and may post a reply to cloud computing server systems 18 by posting the reply to the transaction queue 14 associated with a server application 30. In the present example, cloud computing server system 18 is associated with IoT device 1. The transaction queue 14 is configured such that anyone can post to the transaction queue 14, but only the IoT device 1 that is associated with the cloud computing server system 18 can pull messages from the transaction queue 14.

Figure 3:
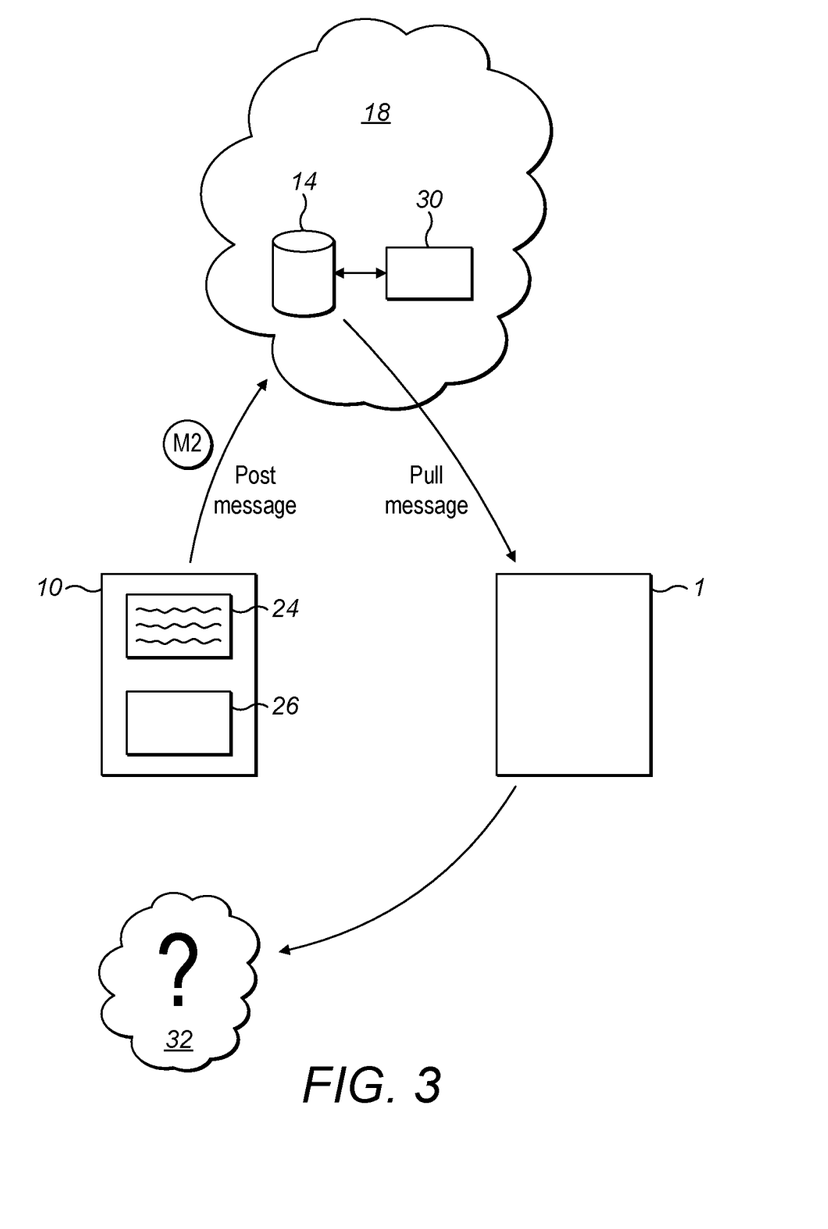
FIG. 3 schematically shows an example of a data processing device attempting to communicate with a remote resource on a different cloud computing system.

FIG. 3 schematically shows an example of an IoT device 1 attempting to communicate with a remote resource 10 on a different cloud computing platform 32 than adopted by the cloud computing server system 18 associated with the IoT device 1. In the present example, the remote resource 10 posts a message M2 to the cloud computing server system 18 associated with the IoT device 1. As before, cloud computing server system 18 is associated with IoT device 1 and the transaction queue 14 is configured such that anyone can post to the transaction queue 14, but only the IoT device 1 that is associated with the cloud computing server system 18 can pull messages from the transaction queue 14. Should the IoT device 1 want to reply with the remote resource 10 it must first locate the cloud computing server system 32 associated with the remote resource 10. In the case where the location is hidden, perhaps due to encryption or disguising of the location url of the cloud computing server system 32 then the IoT device 1 may not be able to post a reply to the remote resource 10.

Figure 4:
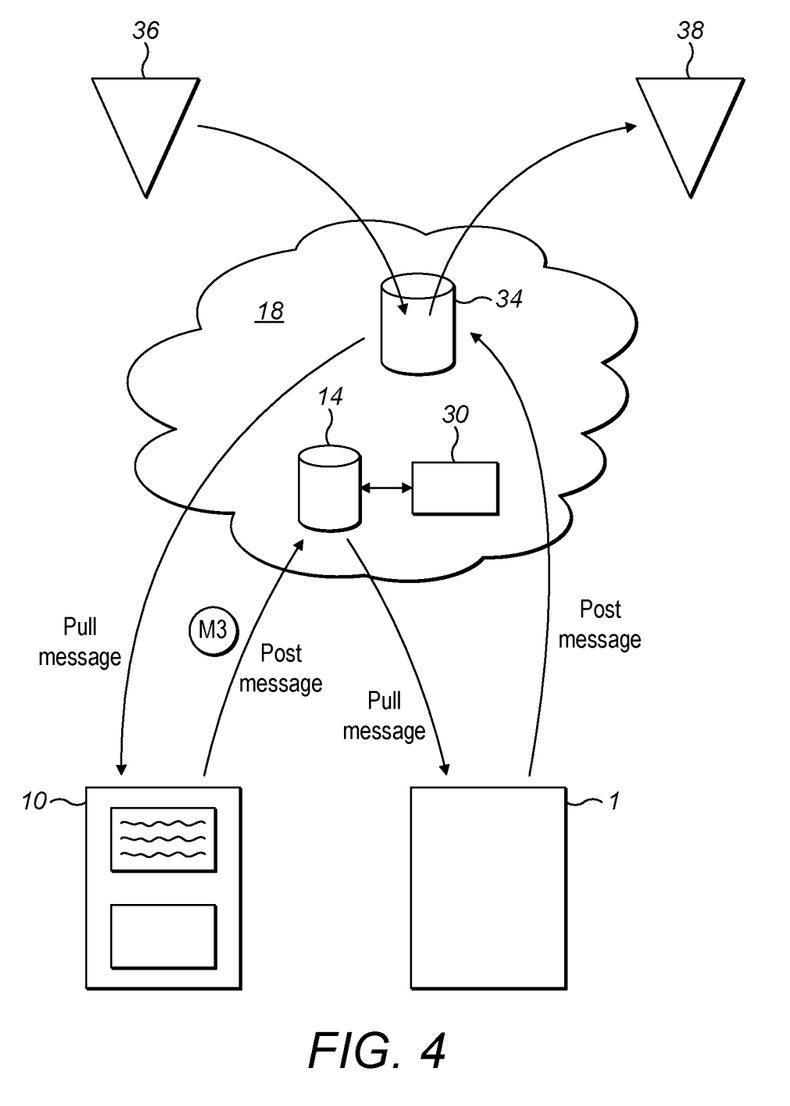
FIG. 4 schematically shows communication using a guest transaction queue set-up between the data processing device and the remote resource according to a first technique.

FIG. 4 schematically shows communication using a guest transaction queue set-up between the data processing device and the remote resource according to a first technique. Referring to FIG. 4, the remote resource 10 posts a message M3 to the to the cloud computing server system 18 associated with the IoT device 1. As before, cloud computing server system 18 is associated with IoT device 1 and the transaction queue 14 is configured such that anyone can post to the transaction queue 14, but only the IoT device 1 that is associated with the cloud computing server system 18 can pull messages from the transaction queue 14. Within cloud computing server system 18 is a guest queue 34 which requires no credentials for posting or for pulling messages therefrom. Accordingly, the IoT device 1 may post a reply message to guest queue 34 from which remote resource 10 may pull the message.

One effect of the creation of a guest queue 34 is that third party devices 36, 38 could use the guest queue for anonymous file sharing or communication. Such an effect may result in bandwidth overload and lead to poor network performance experienced by IoT device 1.

Figure 5:
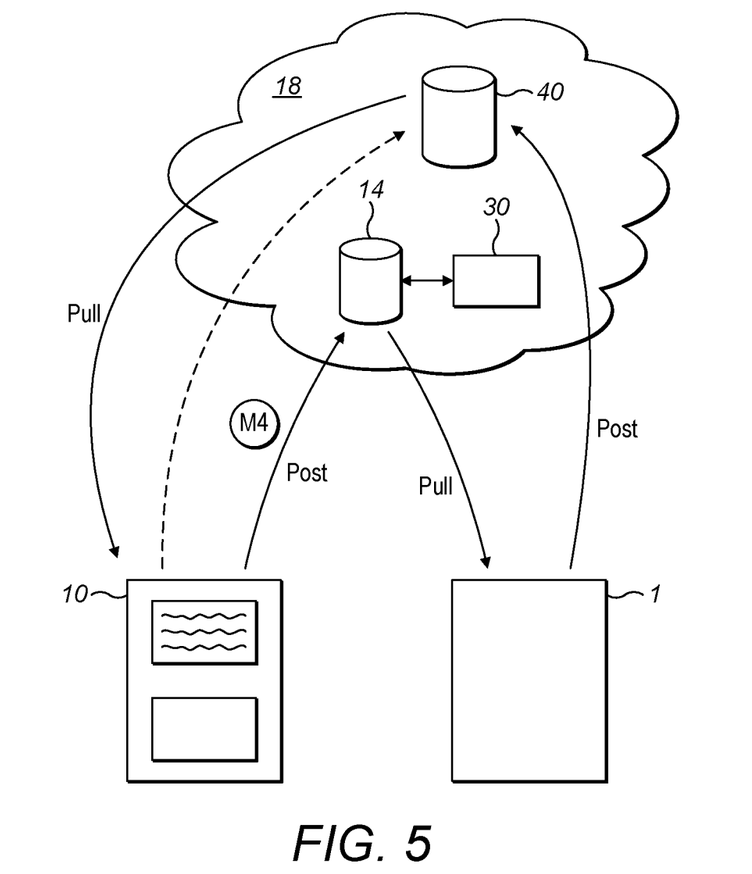
FIG. 5 schematically shows communication using a guest transaction queue set-up between the data processing device and the remote resource according to a second technique.

FIG. 5 schematically shows communication using a guest transaction queue set-up between the data processing device and the remote resource according to a second technique. Referring to FIG. 5, the remote resource 10 posts a message M4 to the to the cloud computing server system 18 associated with the IoT device 1. As before, cloud computing server system 18 is associated with IoT device 1 and the transaction queue 14 is configured such that anyone can post to the transaction queue 14, but only the IoT device 1 that is associated with the cloud computing server system 18 can pull messages from the transaction queue 14.

At the time of posting the message M4 to the cloud computing server system 18, the remote resource 10 sends a request to the cloud computing server system 18 to setup one or more guest queues for the remote resource 10. Also, the part of the message M3 that includes the "return address/reply to" bits of information may include which one or more guest queues 40 should be used as a return channel. Since only the IoT device 1 can post a reply to the guest queue 40 then there is reduced risk of third party device exploiting the resource of the guest queue 40. The IoT device 1 posts a reply to the guest queue 40 which is in turn pulled from the guest queue 40 by the remote resource 10.

By providing a queue in this way, the IoT device 1 can receive requests from one or more remote resources 10 and post data to the remote resource 10 asynchronously. Therefore, there is no requirement for the IoT device 1 and remote resource 10 to be active simultaneously.

In some embodiments, message data may be encrypted by the IoT device 1 before posting the message data to the remote resource 10. Any suitable encryption standard may be used, for example, AES-128 AES-192 or AES-256.

However, even if the message data is encrypted, the fact that the IoT device 1 posts message data to intuitive/known addresses identified by an identifier such as a URL, for example, in the case of a smart-pen to " . . . /living_room/pen/write_summary" or for example in the case of a temperature sensor to, " . . . /kitchen/temperature_sensor/temp_summary", then it may be possible for parties such as the cloud provider, the internet service provider (ISP) or an attacker to derive personal information from the identifier even if the data itself is encrypted.

For example, the parties may infer from the example identifiers above that the user owns a smart-pen or temperature sensor, and may use that information to target the owner of the IoT device e.g. with advertisements for sales or an attacker may attempt to send malware to a specific type of IoT device known to be easily compromised etc.

Figure 6A:
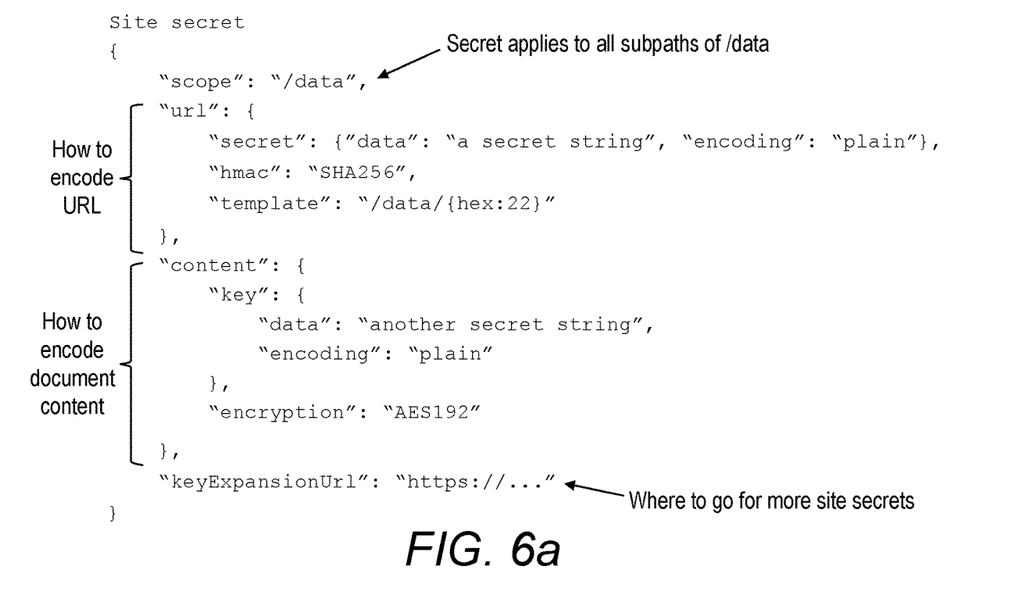
FIG. 6a schematically shows an example of a site secret for the remote resource.

To address this issue in some embodiments the IoT device 1 may be provided with secret information as shown in FIG. 6a.

Figure 6B:
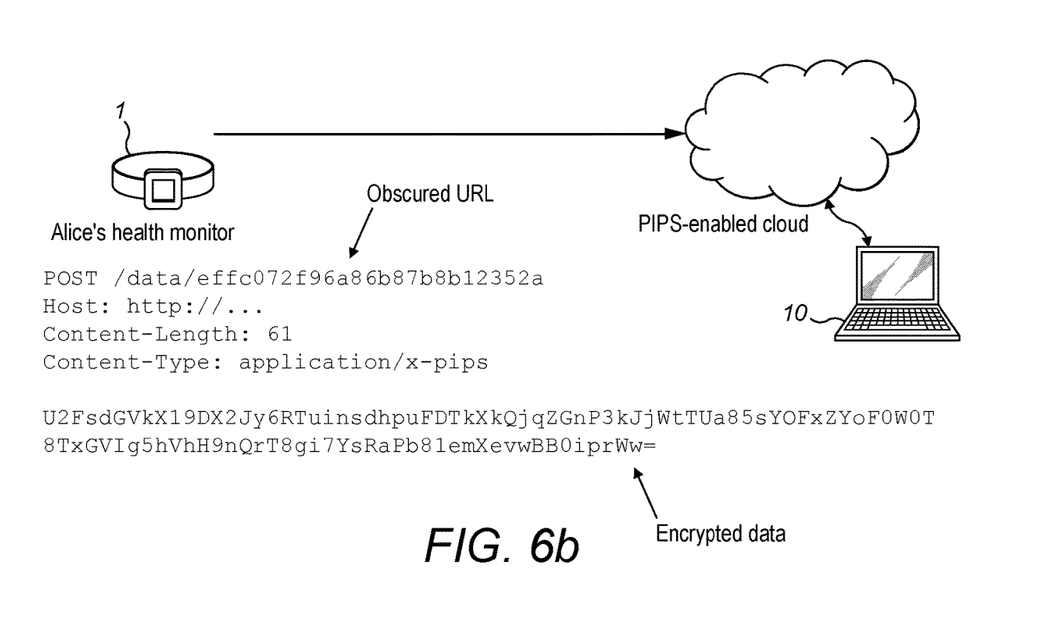
FIG. 6b schematically shows an example of accessing the resource the resource at an obscured URL generated using the site secret.

This secret information is collectively referred to as a "site secret," which can be used to disguise/transform the address of the location to which the IoT device 1 posts data. The site secret may be provided in memory of the IoT device 1 for a particular URL ("first URL) and/or for a particular user/device as part of the connectivity data. FIG. 6b shows an example of posting a message to a cloud server at an obscured URL generated using the site secret. The IoT device 1 may use the first URL to identify the destination to which the data is to be posted or pulled respectively however the first URL does not identify the actual location of the remote resource 10.

The site secret is used by the IoT device 1 for mapping/transforming the first URL into a different obscured URL which is then used to identify the actual destination on the cloud server as only the obscured URL needs to be exposed to the network. The site secret also includes URL encoding information which specifies how to generate the obscured URL of the remote resource 10.

As shown in FIG. 6*a*, the site secret includes a scope which specifies the remote resources to which the site secret applies. In the present example, the scope portion indicates paths or sub-paths of the resources to which the site secret applies. In the present example, the site secret applies to the path "/data". The site secret may also apply to all sub-paths of the path indicated in the scope. Hence, accesses to resources not within the specified path (including sub-paths) may not succeed.

In the present example, the URL encoding information includes a secret string to be used as a key for transforming the first URL into the obscured URL, data defining a transformation to use for generating an encoded string for the obscured URL (e.g. SHA256) and a template URL into which the encoded string can be inserted to form the obscured URL.

SHA256 is a one-way transformation, which means that even if the secret string (key) is known, it is not possible to use the key to transform the obscured URL back into the first URL. Other transformations may also be used (e.g. md5 or other SHA algorithms, CRC32) In this example, the template is "/data/{hex:22}", which means that a 22-character truncated string generated based on the SHA256 algorithm is inserted into the template to create the obscured URL. The string to be inserted into the template may be a truncated version of the actual result of the transformation (it is not essential to use all bits of the encoded string in the URL). In other examples, the full string generated by the hash algorithm may be used.

The site secret may also comprise content encryption information defining how to encode data to be sent to the remote resource 10. In the present example the AES192 algorithm may be used for encryption, although any suitable encoding may be used.

As such, instead of posting data (first type and second type) in the to the first URL, from which parties may infer sensitive information, the IoT device 1 may post data to an obscured URL, and whereby the data may be encrypted, so that both the data and the URL correspond to an unintelligible string of characters which does not allow for inference of any information, sensitive or otherwise by parties not privy to the site secret or the encryption information.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

As an example, although reference to remote resource and data processing device has been used in the specification, the terms anonymous user and established user may be used. In such a way, the anonymous user may communicate with an established user and either user may be represented by a data processing device or remote resource. Further examples include:

Anonymous device to established device using a cloud server to bridge asynchronous communication Anonymous client talking to established web service such as guest book, feedback or customer chat on a website Unknown webservice talking to established web service

The invention claimed is:

1. A method of providing for asynchronous communication between a remote resource and a data processing device, the method including:
    storing in a transaction queue a first message received from the remote resource, the transaction queue being configured such that a plurality of remote resources can post messages to the transaction queue but only the data processing device can pull messages from the transaction queue;
    receiving a request from the data processing device to create a guest transaction queue;
    creating the guest transaction queue, the guest transaction queue being accessible by both the data processing device and the remote resource and being configured such that a plurality of remote resources can pull messages from the guest transaction queue without requiring credentials;
    in response to a pull request received from the data processing device, providing the first message stored in the transaction queue to the data processing device;
    storing, in the guest transaction queue, a second message received from the data processing device in response to the first message; and
    in response to a pull request received from the remote resource, providing the second message stored in the guest transaction queue to the remote resource,
    wherein the request to create the guest transaction queue received from the data processing device is sent to the data processing device by the remote resource.

2. The method of claim 1, wherein the request to create the guest transaction queue is sent from the data processing device to a server application.

3. The method of claim 2, wherein the data processing device is registered with the server application and the remote resource is not so registered.

4. The method of claim 1, wherein the first message received from the remote resource comprises information that the data processing device should use the guest transaction queue for responding.

5. The method of claim 1, wherein the guest transaction queue is configured to only post messages from the data processing device to the guest transaction queue.

6. The method of claim 1, wherein the guest transaction queue is configured to provide for messages from the guest transaction queue to be read by more than one remote resource.

7. The method of claim 1, wherein the remote resource and the data processing device communicate asynchronously using the queues.

8. The method of claim 1, wherein the messages in the queues sent between the remote resource and data processing device are encrypted.

9. Computer hardware comprising a memory store configured to store a first message received from a remote resource in a transaction queue, the transaction queue being configured such that a plurality of remote resources can post messages to the transaction queue but only the data processing device can pull messages from the transaction queue; processing circuitry configured to create a guest transaction queue upon receipt of a request from the data processing device to create the guest transaction queue, the guest transaction queue being configured such that a plurality of remote resources can pull messages from the guest transaction queue without requiring credentials; and communication circuitry configured to communicate with the remote resource and the data processing device through the transaction queue and the guest transaction queue, wherein the processing circuitry is further configured to:
- in response to a pull request received from the data processing device, provide the first message stored in the transaction queue to the data processing device;
- store, in the guest transaction queue, a second message received from the data processing device in response to the first message; and
- in response to a pull request from the remote resource, provide the second message stored in the guest transaction queue to the remote resource,
- wherein the request to create the guest transaction queue received from the data processing device is sent to the data processing device by the remote resource.

10. Computer hardware as claimed in claim 9, wherein the guest transaction queue is configured to only accept messages from the data processing device.

11. Computer hardware as claimed in claim 9, wherein the remote resource and the data processing device communicate asynchronously using the queues.

12. Computer hardware as claimed in claim 11, wherein the messages in the queues sent between the remote resource and data processing device are encrypted.

13. A method of communication between a remote resource and a data processing device, the method including:
- posting a first message to a transaction queue at a server, the transaction queue storing the first message, being configured such that a plurality of remote resources can post messages to the transaction queue but only the data processing device can pull messages from the transaction queue and being accessible by the data processing device; and
- reading a second message from a guest transaction queue at the server, the second message being posted by the data processing device into the guest transaction queue in response to the first message, wherein the guest transaction queue is created in response to a request from the data processing device, and the guest transaction queue is accessible by both the data processing device and the remote resource and is configured such that a plurality of remote resources can pull messages from the guest transaction queue without requiring credentials,
- wherein the method further comprises sending the request to create the guest transaction queue to the data processing device.

14. The method of claim 13, wherein the remote resource and the data processing device communicate asynchronously using the queues.

15. A method of communication between a remote resource and a data processing device, wherein the data processing device is registered with a server and the remote resource is not so registered, the method comprising:
- reading, from a transaction queue in the server, a first message posted by the remote resource, the transaction queue being configured such that a plurality of remote resources can post messages to the transaction queue but only the data processing device can pull messages from the transaction queue;
- sending a request to create a guest transaction queue at the server, the guest transaction queue being accessible by both the data processing device and the remote resource and being configured such that such that a plurality of remote resources can pull messages from the guest transaction queue without requiring credentials; and
- responding to the first message by posting a second message to the guest transaction queue, wherein only the data processing device can post messages to the guest transaction queue,
- wherein the method further comprises receiving, before said sending, the request to create the guest transaction queue from the remote resource.

* * * * *